Oct. 4, 1932.   W. H. ARMACOST   1,881,160
JOINING PIPES
Filed April 17, 1929

INVENTOR.
Wilbur H. Armacost
BY
ATTORNEY.

Patented Oct. 4, 1932

1,881,160

UNITED STATES PATENT OFFICE

WILBUR H. ARMACOST, OF NEW YORK, N. Y., ASSIGNOR TO THE SUPERHEATER COMPANY, OF NEW YORK, N. Y.

JOINING PIPES

Application filed April 17, 1929. Serial No. 355,799.

My invention relates to joining pipes and has for its general purpose the provision of a novel form of welded joint by means of which separate lengths of pipe may be joined to form a substantially integral structure by means of a forged weld between the ends of the pipes to be joined.

In the exercise of my invention the ends of the pipes to be joined are placed over an annular mandrel or anvil and forged together to effect a pressure weld, the mandrel serving to form a support for the pipe ends permitting the necessary pressure to be applied thereto to effect the weld.

Figure 1:
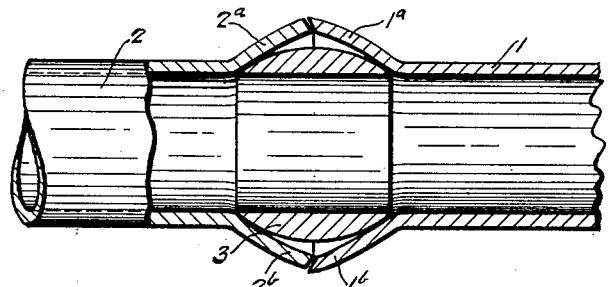
Figure 2:
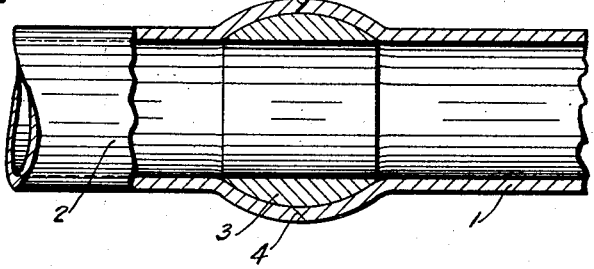
Figure 3:
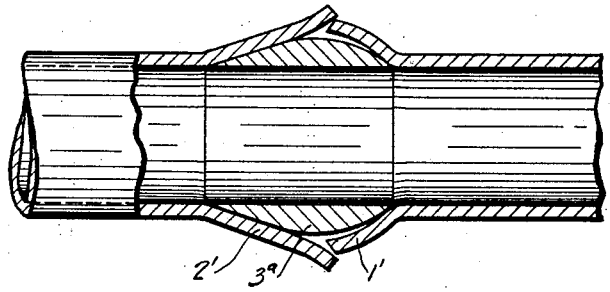
Figure 4:
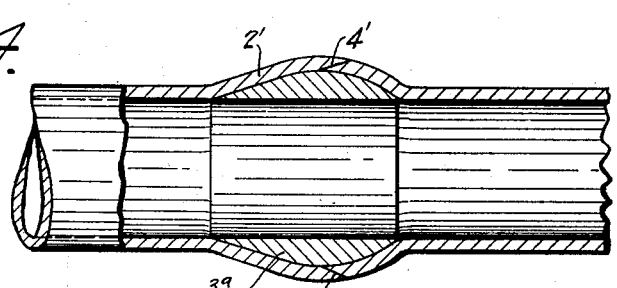

The invention may best be understood by reference to the accompanying drawing in which Fig. 1 is a fragmentary view partly in section showing two pipe ends in position over an anvil ready for welding; Fig. 2 is a view similar to Fig. 1 illustrating the structure shown in Fig. 1 after the weld has been effected; Fig. 3 is a view similar to Fig. 1 showing a slightly modified form of structure ready to be welded and Fig. 4 is a view showing the structure illustrated in Fig. 3 after the weld has been effected.

Referring now to the drawing, there is shown in Fig. 1 two similar pipes 1 and 2 the ends of which have been flared as at 1—a and 2—a and which are preferably, though not necessarily, scarved at 1—b and 2—b. The pipe ends 1—a and 2—a are placed in juxtaposed position over an annular anvil 3 having an internal cylindrical bore, the diameter of which is preferably the same as the internal diameter of the pipes 1 and 2. In the form shown the external surface of the anvil 3 is in the form of a section of a sphere although this exact external contour is not essential. The anvil 3 is however preferably formed so that the ends thereof present relatively thin edges, while the midsection of the anvil is of sufficient thickness to withstand a material compressive stress.

In effecting the joint between the pipe ends the ends 1—a and 2—a are preferably first heated to a welding temperature and placed in the position shown in Fig. 1 over the anvil 3. The anvil 3 may be of the same material as that of the pipes 1 and 2, but to prevent the anvil from unduly cooling the heated ends of the pipes after they have been placed in position and before welding, it may be desirable to heat the anvil also. The anvil does not need to be heated to the temperature of the pipe ends but in many instances it is desirable to heat it to a temperature where ordinary steel would lose its strength, and in such instances the anvil may be made of some special alloy such for example as high speed tool steel or the like which retains its normal physical characteristics even when at a temperature of 1,000 degrees F. or more. Such materials are well known and specific analyses thereof are therefore not herein specified. After the heated pipe ends and the anvil are placed in the position shown in Fig. 1 the welding may be effected by any desired method which will produce an externally applied pressure acting substantially radially and forcing the pipe ends together to a weld over the anvil. As will be readily apparent the weld may be effected by hand hammering, but for production purposes mechanical means are preferably employed. Such means may comprise mechanically operated reciprocating hammers under which the tube ends are placed and rotated, the two pipe ends may be held stationary in a suitable die under rotating and reciprocating hammers, or the weld may be effected by rolling the pipe ends under pressure in a variety of specific ways well known to those skilled in the art. The anvil is in no case welded to the pipes during the operation but remains separate from them.

In Fig. 3 a slightly different arrangement for carrying the process into effect is shown. In this form a portion of the exterior surface of the anvil 3—a is made generally conical, with the taper of the conical surface substantially the same as the taper of the flared pipe end 2′, thus providing co-operating surfaces adapted to co-act so that the anvil may be conveniently inserted in and held by the pipe end 2′ while the end 1′ of the other pipe is placed in position and the weld effected.

It is also to be noted that as shown in Fig. 3 the scarving is confined to the end of the pipe 1' and the ends of the two pipes before welding are placed in over-lapping relation so that a relatively pronounced lap weld is effected by the application of pressure to the pipe ends.

While I have shown the anvils 3 and 3—a as having a maximum wall thickness greater than the wall thickness of the tubes it will be quite evident that this thickness will vary in accordance with the nature of the material forming the pipes to be joined and the amount of pressure required to effect a satisfactory weld of such material. It will further be evident that the amount of over-lap of the pipe ends may be varied as desired and if it is desirable to provide an excess of material at the point where the weld is made this may readily be accomplished by suitably increasing the amount of over-lap.

I have indicated by the lines 4 in Fig. 2 and 4' in Fig. 4, the approximate position of the respective welds but it will be obvious that in the welded structure there is no defined line of demarcation between the two pipe ends, which are merged into a substantially unitary whole by the welding process.

From Figs. 2 and 4 it will be seen that the completed structure provides an unobstructed path through the joined pipes while the external diameter is only slightly increased at the point of juncture, such increase in diameter at this point in some instances being materially less than that shown in the drawing, as for example when the anvil 3 is made of material having exceptionally great strength and the weld is effected by means of a large number of relatively light impacts so that the anvil may be of relatively very thin section without danger of its collapsing during the welding process.

Many variations in the specific manner of carrying the invention into effect will occur to those skilled in the art and the illustrative embodiments herein shown are therefore not to be considered as limiting the invention, which embraces all that may fall within the scope of the appended claims.

I claim:

1. An article of the class described comprising two pipe lengths, an annular anvil being at its thickest portion at least as thick as the pipes and having a cylindrical bore the diameter of which is substantially that of the internal diameter of the pipes, the ends of said pipes extending over said anvil and being joined by a forged weld but separate from the anvil.

2. The method of joining the ends of pipes which consists in heating the ends of said pipes to be joined to a welding temperature, flaring said ends of the pipes, placing the flared ends in overlapping relation over an annular anvil having a circular bore of substantially the same diameter as the inside of pipes, the anvil being below welding temperature and incompressible under blows and being so placed that its bore is in line with the pipes, and applying percussive blows substantially radially to said ends to effect a weld, whereby the pipes are joined with the anvil remaining in place and separate from the pipes, and maintaining its original shape and contour, with the bore at the joint being the same as that of the pipes.

WILBUR H. ARMACOST.